(12) United States Patent
Ayers (10) Patent No.: US 11,019,613 B2
(45) Date of Patent: May 25, 2021

(54) METHODS AND SYSTEMS FOR MANAGING NETWORK RESOURCES OF A VEHICLE

(71) Applicant: Uber Technologies, Inc., San Francisco, CA (US)

(72) Inventor: Steve Ayers, Mars, PA (US)

(73) Assignee: Uber Technologies, Inc., San Francisco, CA (US)

( * ) Notice: Subject to any disclaimer, the term of this patent is extended or adjusted under 35 U.S.C. 154(b) by 24 days.

(21) Appl. No.: 16/458,952

(22) Filed: Jul. 1, 2019

(65) Prior Publication Data

US 2020/0329460 A1    Oct. 15, 2020

Related U.S. Application Data

(60) Provisional application No. 62/833,401, filed on Apr. 12, 2019.

(51) Int. Cl.
| | |
|---|---|
| *H04W 72/04* | (2009.01) |
| *H04W 4/40* | (2018.01) |
| *G07C 5/00* | (2006.01) |
| *H04W 28/02* | (2009.01) |
| *H04W 72/12* | (2009.01) |

(52) U.S. Cl.
CPC .......... *H04W 72/042* (2013.01); *G07C 5/008* (2013.01); *H04W 4/40* (2018.02); *H04W 28/0268* (2013.01); *H04W 72/1257* (2013.01)

(58) Field of Classification Search
CPC . H04W 72/042; H04W 72/1257; H04W 4/40; H04W 28/0268; G07C 5/008
See application file for complete search history.

(56) References Cited

U.S. PATENT DOCUMENTS

| | | | |
|---|---|---|---|
| 2011/0271289 A1* | 11/2011 | Weiser | G06F 9/547 719/317 |
| 2012/0089684 A1 | 4/2012 | Angus et al. | |
| 2013/0170435 A1* | 7/2013 | Dinan | H04W 40/02 370/328 |
| 2016/0100271 A1 | 4/2016 | Buyukkoc et al. | |
| 2017/0366547 A1* | 12/2017 | Goldfarb | H04L 63/102 |

OTHER PUBLICATIONS

International Search Report and Written Opinion for Application No. PCT/US2020/027654, dated Jul. 8, 2020, 12 pages.

* cited by examiner

*Primary Examiner* — Wei Zhao
(74) *Attorney, Agent, or Firm* — Dority & Manning, P.A.

(57) ABSTRACT

The present disclosure is directed to managing network resources of a vehicle. In particular, for each application of a plurality of different and distinct applications executed by a computing system comprising one or more computing devices physically located onboard a vehicle, the computing system can: determine, from amongst a plurality of different and distinct interface identifiers, an interface identifier associated with the application; communicate, based at least in part on the interface identifier associated with the application, data associated with the application and destined for a remotely located computing system; and manage, based at least in part on the interface identifier associated with the application, utilization by the application of network resources interfacing the computing system and the remotely located computing system to communicate the data associated with the application and destined for the remotely located computing system.

20 Claims, 8 Drawing Sheets

METHODS AND SYSTEMS FOR MANAGING NETWORK RESOURCES OF A VEHICLE

PRIORITY CLAIM

This application claims priority to U.S. Patent Application Ser. No. 62/833,401, filed Apr. 12, 2019, and entitled "METHODS AND SYSTEMS FOR MANAGING NETWORK RESOURCES OF AN AUTONOMOUS VEHICLE," the disclosure of which is incorporated by reference herein in its entirety.

FIELD

The present disclosure relates generally to vehicles. More particularly, the present disclosure relates to managing network resources of a vehicle.

BACKGROUND

A vehicle can be used to provide transportation in one or more different contexts. An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include, for each application of a plurality of different and distinct applications executed by a computing system comprising one or more computing devices physically located onboard a vehicle: determining, by the computing system and from amongst a plurality of different and distinct interface identifiers, an interface identifier associated with the application; communicating, by the computing system and based at least in part on the interface identifier associated with the application, data associated with the application and destined for a remotely located computing system; and managing, by the computing system and based at least in part on the interface identifier associated with the application, utilization by the application of network resources interfacing the computing system and the remotely located computing system to communicate the data associated with the application and destined for the remotely located computing system.

Another example aspect of the present disclosure is directed to a vehicle. The vehicle can include one or more wireless-communication interfaces and one or more computing devices comprising one or more processors and a memory storing instructions that when executed by the processor(s) cause the computing device(s) to perform operations. The operations can include, for each application of a plurality of different and distinct applications executed by the computing device(s): determining, from amongst a plurality of different and distinct interface identifiers associated with a common virtual loopback interface, an interface identifier associated with the application; and managing, based at least in part on the interface identifier associated with the application, utilization by the application of network resources interfacing the computing device(s) with a remotely located computing system to communicate data associated with the application towards the remotely located computing system via the wireless-communication interface(s).

A further example aspect of the present disclosure is directed to one or more non-transitory computer-readable media comprising instructions that when executed by one or more computing devices physically located onboard a vehicle cause the computing device(s) to perform operations. The operations can include, for each application of a plurality of different and distinct applications executed by the computing device(s), managing, at a network layer, utilization by the application of wireless-network resources interfacing the computing device(s) with a remotely located computing system to communicate data associated with the application towards the remotely located computing system.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Example aspects of the present disclosure are directed to managing network resources of a vehicle (e.g., an autonomous vehicle, a human-operated vehicle, remotely controlled vehicle, ground-based vehicle, air-based vehicle (e.g., vertical take-off and landing (VTOL) vehicle, and/or the like), water-based vehicle, and/or the like). In particular, one or more computing devices physically located onboard a vehicle can execute multiple different and distinct applications (e.g., components of one or more software packages configured to operate, control, and/or the like the vehicle, and/or the like). For example, such applications can provide, enable, support, and/or the like navigation of the vehicle, diagnostics of the vehicle, remote-assistance for the vehicle, navigation of the vehicle, telecommunications for the vehicle, infotainment for the vehicle, one or more associated data or video streams, and/or the like.

For each application of the applications, the onboard computing device(s) can determine, from amongst multiple different and distinct interface identifiers (e.g., addresses, ports, links, and/or the like), an identifier associated with the application and can communicate, based at least in part on such identifier, data associated with the application and destined for a remotely located computing system (e.g., a server, vehicle-management platform, and/or the like) towards the remotely located computing system.

In accordance with aspects of the disclosure, for each application of the applications, the onboard computing device(s) can manage, based at least in part on the interface identifier associated with the application, utilization by the application of network resources (e.g., bandwidth, and/or the like) interfacing the onboard computing device(s) and the remotely located computing system to communicate the data associated with the application and destined for the remotely located computing system.

Over time the mode, state, context, and/or the like of the vehicle can change (e.g., specified travel can be completed, new travel can commence, one or more diagnostic routines can be initiated, the surrounding environment, traffic, weather conditions, and/or the like can change, and/or the like), and in some embodiments, the onboard computing device(s) can determine, detect, identify, and/or the like such changes. For example, the onboard computing device(s) can determine, detect, identify, and/or the like whether the vehicle is in a test mode, whether the vehicle is in a diagnostic mode, whether the vehicle is in a remote-assistance mode, whether the vehicle is in an environment-mapping mode, whether the vehicle is engaged in commissioned travel, a type of commissioned travel with which the vehicle is engaged, and/or the like. In some of such embodiments, for one or more of the applications, the onboard computing devices can manage the utilization by such application(s) of the network resources based at least in part on such change(s). For example, based on a determination that the vehicle is in a diagnostics mode, more of the network resources can be allocated to communicating log data, and/or the like.

In some embodiments, the onboard computing device(s) can receive data (e.g., configuration information, and/or the like) including instructions for managing, at least in part, data associated with one or more of the applications from a remotely located computing device (e.g., associated with a technician, diagnostic system, remote-assistance system, and/or the like). For example, such communication can be via an application programming interface (API) provided by the remotely located computing device, the onboard computing device(s), and/or the like (e.g., such an API can serve to effectuate a central configuration service used to provide dynamic configuration changes to one or more vehicles, and/or the like). In some embodiments, such an API can include parameters for specifying priorities, resource allocations, and/or the like, for example, with respect to one or more of the applications, and/or the like. In some embodiments, the onboard computing device(s) can manage the utilization by such application(s) of the network resources based at least in part on the data including the instructions (e.g., associated with the API, and/or the like).

In some embodiments, the onboard computing device(s) can manage the utilization of the network resources at a media layer of the open systems interconnection (OSI) model (e.g., the level-three network layer, and/or the like). For example, the onboard computing device(s) can manage the utilization of the network resources based on various network addresses associated with the different applications, which can thereby enable efficient, granular, and/or the like management of the resources utilized by such applications, and/or the like.

In some embodiments, for each application of the applications, the onboard computing device(s) can perform, based at least in part on the interface identifier associated with the application, network address translation (NAT) for the data associated with the application to route the data associated with the application towards the remotely located computing system. For example, the onboard computing device(s) can translate one or more network addresses utilized to manage the network traffic associated with the various applications (e.g., onboard the vehicle, and/or the like) to one or more external addresses associated with the remotely located computing system, for example, enabling onboard management of such traffic, while supporting external communication of the traffic, and/or the like.

In some embodiments, the onboard computing device(s) can manage the utilization by the application of the network resources by identifying, based at least in part on the interface identifier, a traffic-control policy for the data associated with the application and managing the utilization by the application of the network resources in accordance with the traffic-control policy for the data associated with the application. In some embodiments, identifying the traffic-control policy can include identifying, within a network-address-based table, one or more quality of service (QoS) parameters (e.g., resource allocations, utilization limits, and/or the like) for the data associated with the application. In some of such embodiments, managing the utilization by the application of the network resources can include managing the utilization by the application of the network resources in accordance with the one or more QoS parameters. For example, managing the utilization by the application of the network resources can include managing the utilization by the application of the network resources in accordance with one or more determined parameters governing priority of particular network traffic (e.g., associated with a given application, and/or the like), resources (e.g., bandwidth, and/or the like) allocated to particular network traffic, and/or the like.

In some embodiments, the multiple different and distinct interface identifiers can be associated with a common (e.g., the same, and/or the like) virtual loopback interface. In some of such embodiments, managing the utilization by the application of the network resources can include managing the utilization by the application of the network resources in accordance with a root queue discipline (qdisc) associated with the common virtual loopback interface. For example, the utilization by the application of the network resources may be managed using a hierarchical token-bucket paradigm to shape the data associated with the application.

In some embodiments, managing the utilization by the application of the network resources can include identifying, based at least in part on the interface identifier associated with the application, a child discipline of the root qdisc associated with the application. In some of such embodiments, utilization by the application of the network resources can be managed in accordance with the child discipline of the root qdisc associated with the application.

In some embodiments, for one or more applications, managing the utilization by such application(s) of the network resources can include borrowing, based at least in part on the child discipline(s) of the root qdisc associated with such application(s), a portion of the network resources allocated to one or more other of the applications, which can, for example, allow for dynamic resource allocation, leading to faster processing times, response times, and/or the like.

In some embodiments, the vehicle and the remotely located computing system can be associated with a common entity, for example, an entity that operates the vehicle, as well as one or more different and distinct vehicles associated with the vehicle (e.g., a fleet of vehicles, and/or the like). In some of such embodiments, communicating data associated with the application can comprise communicating, via one or more networks (e.g., wireless networks, wired networks, and/or the like), the data associated with the application directly from the vehicle to the remotely located computing system.

Additionally or alternatively, the vehicle can be associated with an entity (e.g., a third-party vehicle provider, entity that provides vehicle services, and/or the like) different and distinct from the entity with which the remotely located computing system is associated. In some of such embodiments, communicating the data associated with the application can comprise communicating, via one or more networks (e.g., wireless networks, wired networks, and/or the like), the data associated with the application directly from the vehicle to the remotely located computing system. For example, such communication can be via an API provided by the remotely located computing system, the onboard computing device(s), and/or the like.

Additionally or alternatively, the vehicle can be associated with a different and distinct remotely located computing system (e.g., associated with the third-party vehicle provider, entity that provides vehicle services, and/or the like). In some of such embodiments, communicating the data associated with the application can include: communicating, via one or more networks (e.g., wireless networks, wired networks, and/or the like), the data associated with the application directly from the vehicle to such different and distinct remotely located computing system; and receiving, by the remotely located computing system and from such different and distinct remotely located computing system, the data associated with the application. For example, such communication can be via an API provided by the remotely located computing system, the different and distinct remotely located computing system, the onboard computing device(s), and/or the like.

In some embodiments, the onboard computing device(s) can communicate the data associated with the application via a software development kit (SDK) provided to the onboard computing device(s) by the remotely located computing system. For example, such an SDK can include one or more routines, libraries, logic, and/or the like that can be utilized (e.g., by an entity associated with the vehicle, and/or the like) to communicate the data associated with the application, and/or the like.

Various means can be configured to perform the methods and processes described herein. For example, a computing system can include identifier-determination unit(s), resource-utilization-management unit(s), data-communication unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to, for each application of the applications, determine the interface identifier associated with the application, communicate the data associated with the application, and manage the utilization by the application of the network resources.

The technology described herein can provide a number of technical effects and benefits. For example, the technology described herein can manage the utilization of network resources by various applications executed by computing devices onboard the vehicle, and can do so based at least in part on determining change(s) to the mode, state, context, and/or the like of the vehicle. Such management can optimize communication usage relative to the current operating mode, state, context, and/or the like of the vehicle. For example, given certain modes, states, contexts, and/or the like (e.g., remote assistance, and/or the like), it may be advantageous to allocate more network resources to particular applications (e.g., those important to providing effective remote assistance, and/or the like), while in other modes, states, contexts, and/or the like (e.g., diagnostics, and/or the like), such resources may be better allocated to other applications, and/or the like (e.g., those important to providing effective diagnostics, and/or the like). Accordingly, the technology described here can dynamically adjust the utilization of such network resources, and/or the like in a manner that reduces resource consumption, optimizes resource utilization, improves performance, and/or the like.

While the present disclosure is described through with reference to vehicles, this description is provided by way of example and not intended to be limiting. For example, the technology described herein can be utilized with robotic systems and/or other types of computing systems (mobile or stationary).

With reference now to the figures, example embodiments of the present disclosure will be discussed in further detail.

Figure 1:
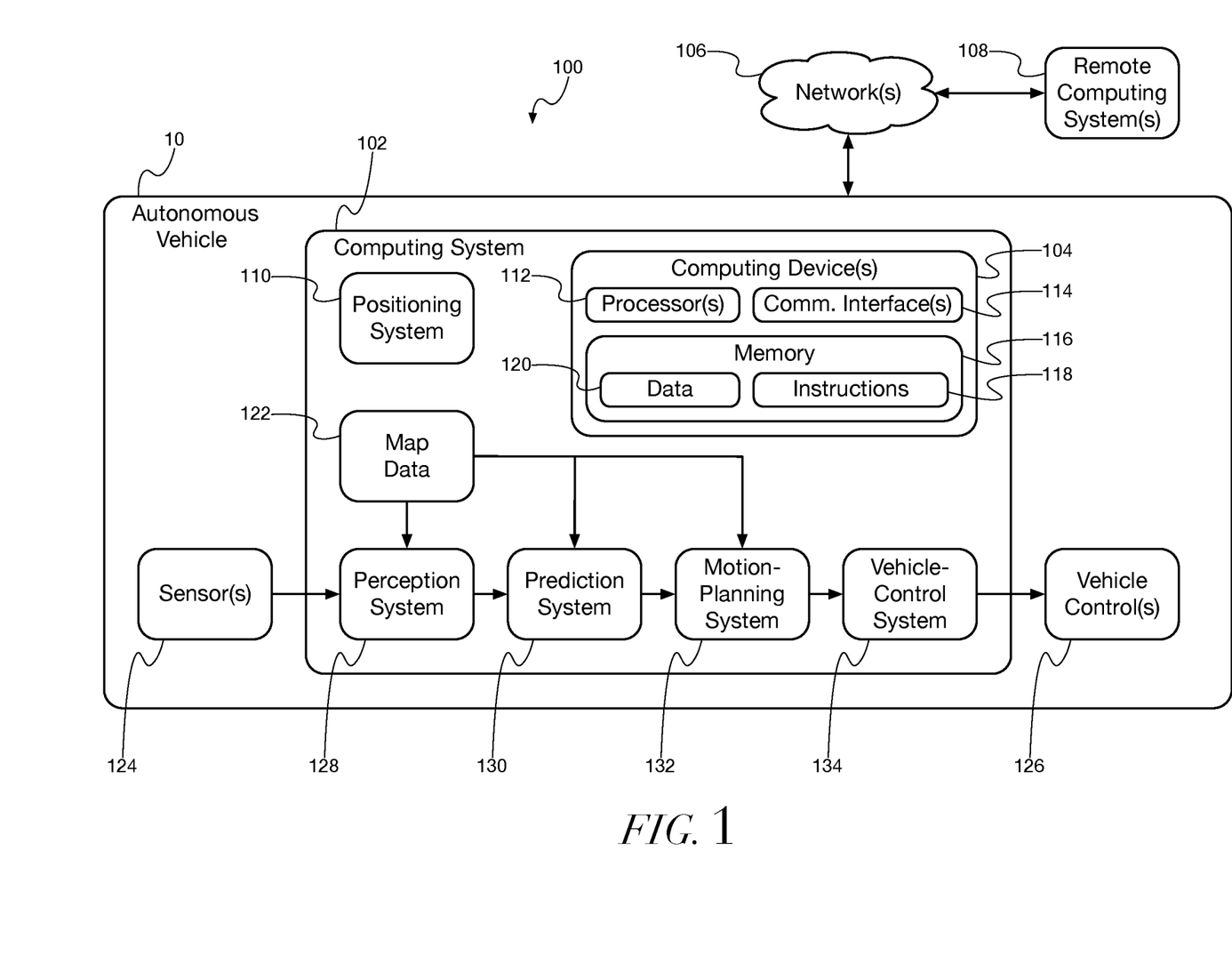
FIG. 1 depicts an example autonomous vehicle according to example embodiments of the present disclosure.

FIG. 1 depicts an example autonomous vehicle according to example embodiments of the present disclosure.

Referring to FIG. 1, environment 100 can include autonomous vehicle 10, one or more networks 106, and one or more remotely located computing systems 108.

Autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, bike, scooter, light electric vehicle, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system(s) 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system(s) 108 can be distinct and/or remotely located from autonomous vehicle 10. Network(s) 106 (e.g., wired networks, wireless networks, and/or the like) can interface autonomous vehicle 10 (e.g., computing system 102, computing device(s) 104, and/or the like) with computing system(s) 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system(s) 108, by a combination of computing system(s) 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

Figure 2:
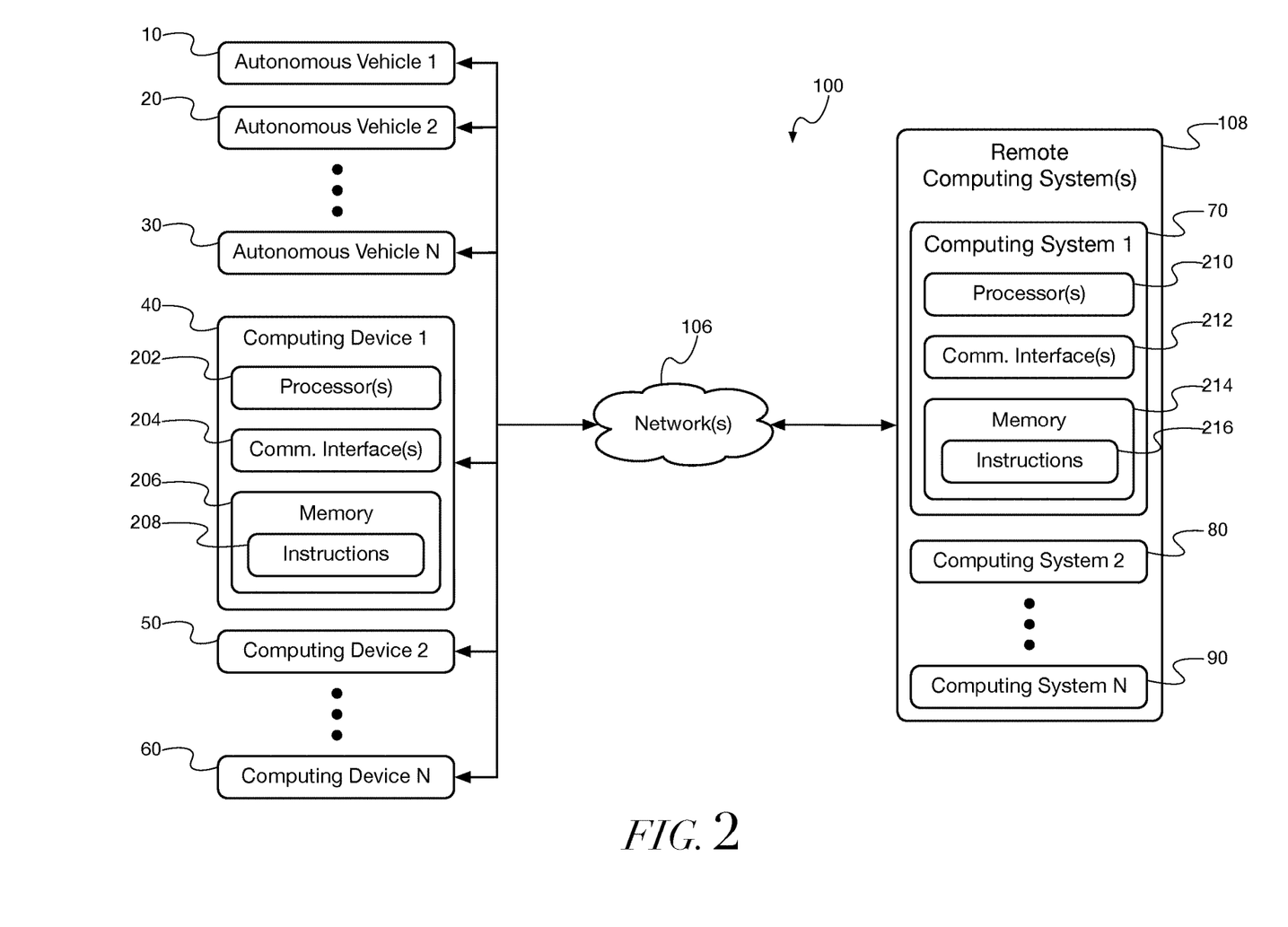
FIG. 2 depicts an example computing environment according to example embodiments of the present disclosure.

FIG. 2 depicts an example computing environment according to example embodiments of the present disclosure.

Referring to FIG. 2, as previously indicated, environment 100 can include autonomous vehicle 10, network(s) 106, and computing system(s) 108. Environment 100 can also include autonomous vehicle(s) 20 and/or 30, and/or computing device(s) 40, 50, and/or 60.

Autonomous vehicle(s) 20 and/or 30 can include one or more components analogous to those described above with respect to autonomous vehicle 10, and/or the like.

Computing device 40 can include circuitry configured to perform one or more operations, functions, and/or the like described herein. For example, computing device 40 can include one or more processor(s) 202, one or more communication interfaces 204, and memory 206 (e.g., one or more hardware components for storing executable instructions, data, and/or the like). Communication interface(s) 204 can enable computing device 40 to communicate with autonomous vehicle 10 (e.g., computing system 102, computing device(s) 104, and/or the like), autonomous vehicle(s) 20 and/or 30, computing device(s) 50, and/or 60, computing system(s) 108, and/or the like. Memory 206 can include (e.g., store, and/or the like) instructions 208, which, when executed by processor(s) 202, can cause computing device 40 to perform one or more operations, functions, and/or the like described herein.

Computing device(s) 50 and/or 60 can include one or more components analogous to those described above with respect to computing device 40, and/or the like.

Computing system(s) 108 can include one or more computing systems, such as, for example, computing system(s) 70, 80, and/or 90.

Computing system 70 can include one or more computing devices, which can include circuitry configured to perform one or more operations, functions, and/or the like described herein. For example, computing system 70 can include one or more processor(s) 210, one or more communication interfaces 212, and memory 214 (e.g., one or more hardware components for storing executable instructions, data, and/or the like). Communication interface(s) 212 can enable computing system 70 to communicate with autonomous vehicle 10 (e.g., computing system 102, computing device(s) 104, and/or the like), autonomous vehicle(s) 20 and/or 30, computing device(s) 40, 50, and/or 60, computing system(s) 80 and/or 90, and/or the like. Memory 214 can include (e.g., store, and/or the like) instructions 216, which, when executed by processor(s) 210, can cause computing system 70 (e.g., one or more computing devices included therein, and/or the like) to perform one or more operations, functions, and/or the like described herein.

Computing system(s) 80 and/or 90 can include one or more components analogous to those described above with respect to computing system 70, and/or the like.

It will be appreciated that irrespective of attribution described or implied herein, unless explicitly indicated otherwise, the operations, functions, and/or the like described herein can be performed by autonomous vehicle(s) 10 (e.g., computing system 102, computing device(s) 104, and/or the like), 20, and/or 30, computing device(s) 40, 50, and/or 60, and/or computing system(s) 108 (e.g., by autonomous vehicle(s) 10, 20, and/or 30, by computing device(s) 40, 50, and/or 60, by computing system(s) 70, 80, and/or 90, by a combination of autonomous vehicle(s) 10, 20, and/or 30, computing device(s) 40, 50, and/or 60, computing system(s) 70, 80, and/or 90, and/or the like).

Figure 3A:
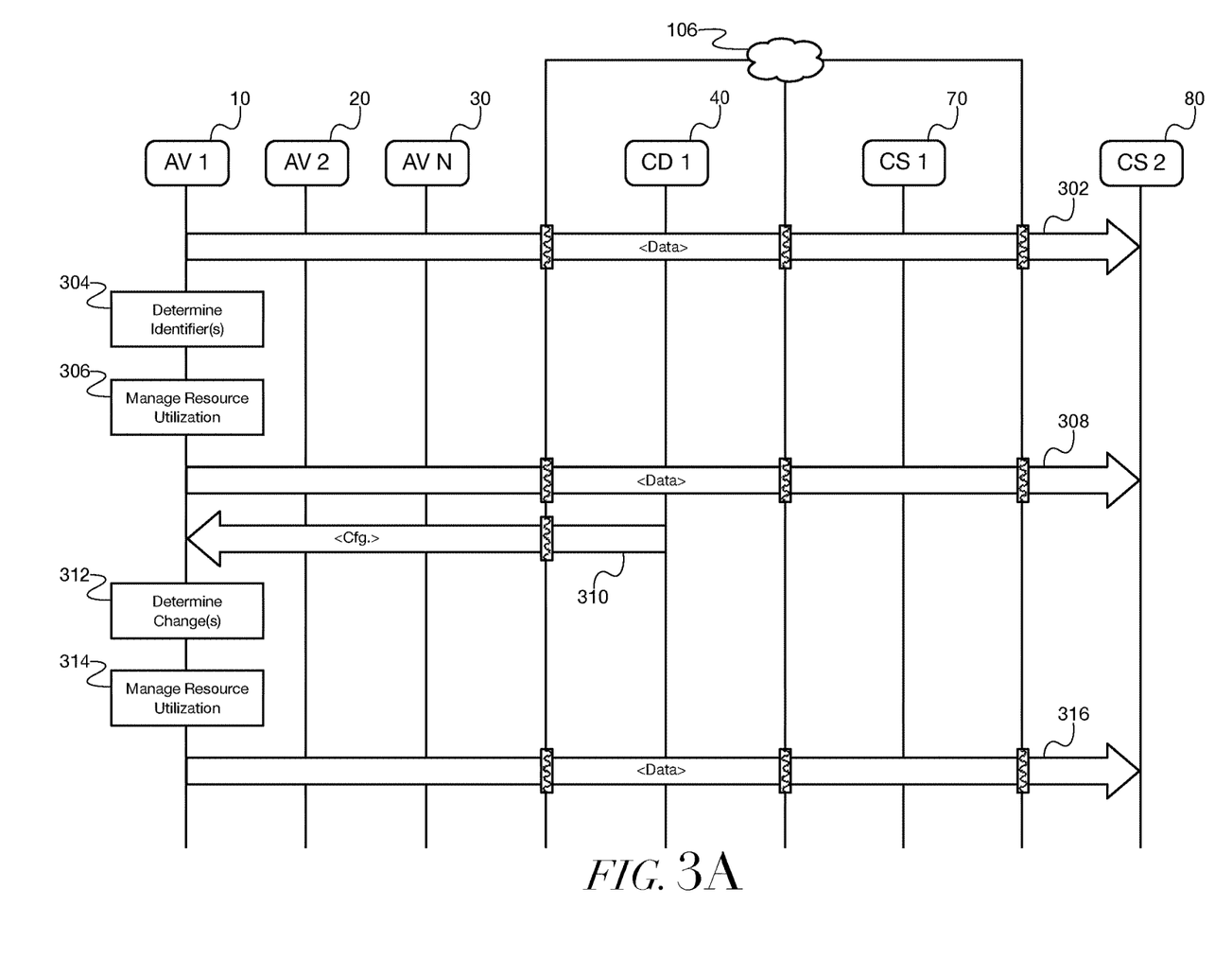
FIGS. 3A-C depict an example event sequence according to example embodiments of the present disclosure.
Figure 3B:
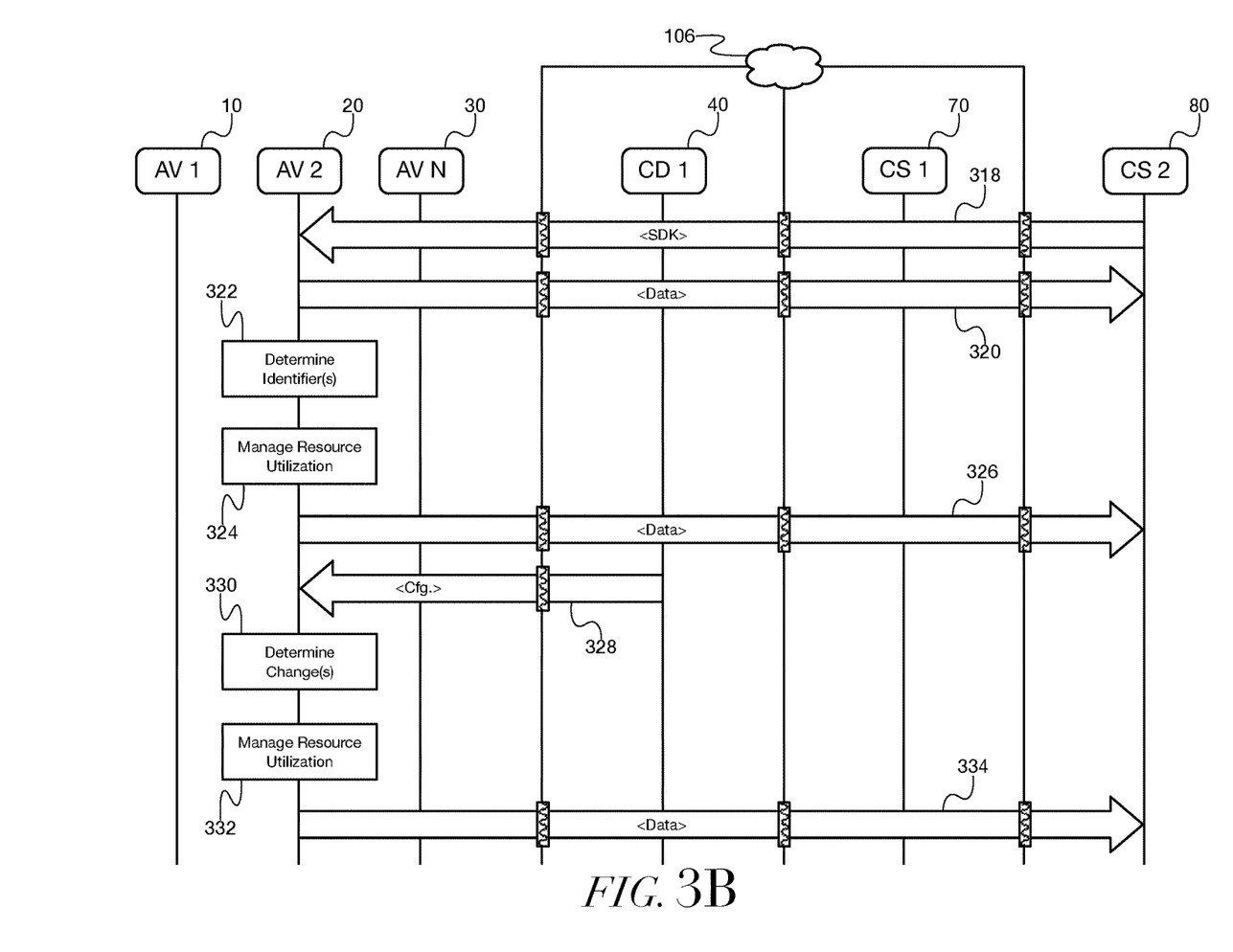
Figure 3C:
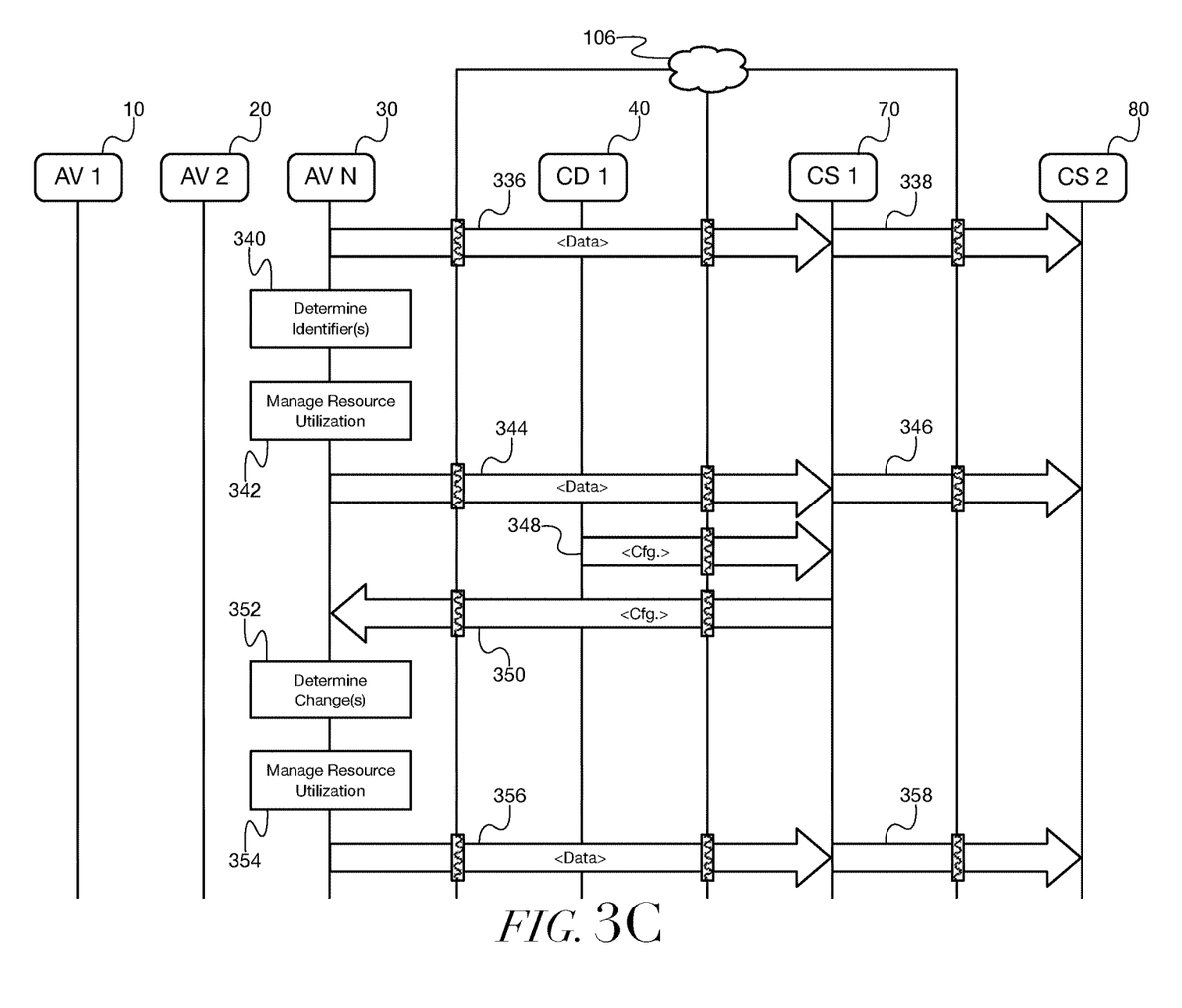

FIGS. 3A-C depict an example event sequence according to example embodiments of the present disclosure.

Referring to FIG. 3A, autonomous vehicle 10 (e.g., computing system 102, computing device(s) 104, and/or the like) can execute multiple different and distinct applications (e.g., components of one or more software packages configured to operate, control, and/or the like autonomous vehicle 10, and/or the like). For example, such applications can provide, enable, support, and/or the like navigation of autonomous vehicle 10, diagnostics of autonomous vehicle 10, remote-assistance for autonomous vehicle 10, one or more associated data or video streams, and/or the like.

At (302), autonomous vehicle 10 (e.g., computing system 102, computing device(s) 104, and/or the like) can communicate (e.g., via network(s) 106, as indicated by the pattern-filled boxes over the lines extending downward from network(s) 106, and/or the like) data associated with such applications to computing system 80 (e.g., a server, vehicle-management platform, and/or the like), which can receive the data. For example, computing system 80 can be associated with an entity that operates a plurality of associated autonomous vehicles (e.g., a fleet of autonomous vehicles, and/or the like) that includes autonomous vehicle 10, and computing system 102 can be configured to communicate (e.g., transmit, and/or the like) data associated with the applications to computing system 80 (e.g., directly via communication interface(s) 114, network(s) 106, and/or the like). In some embodiments, computing system 80 can be remotely located from autonomous vehicle 10 (e.g., a server, one or more computing devices physically located onboard a different vehicle, and/or the like).

At (304), for each application of the applications, computing system 102 can determine, from amongst multiple different and distinct interface identifiers (e.g., addresses, ports, links, and/or the like), an identifier associated with the application and can communicate (e.g., via the communication at (302), and/or the like), based at least in part on such identifier, data associated with the application and destined for computing system 80 towards computing system 80.

At (306), for each application of the applications, computing system 102 can manage, based at least in part on the interface identifier associated with the application, utilization by the application of network resources (e.g., bandwidth, and/or the like) interfacing computing system 102 and computing system 80 to communicate the data associated with the application and destined for computing system 80.

At (308), for each application of the applications and in accordance with such resource management, computing system 102 can communicate data associated with the application to computing system 80, which can receive the data.

In some embodiments, computing system 102 can manage the utilization of the network resources at a media layer of the open systems interconnection (OSI) model (e.g., the level-three network layer, and/or the like). For example, FIG. 4 depicts an example system architecture according to example embodiments of the present disclosure.

Figure 4:
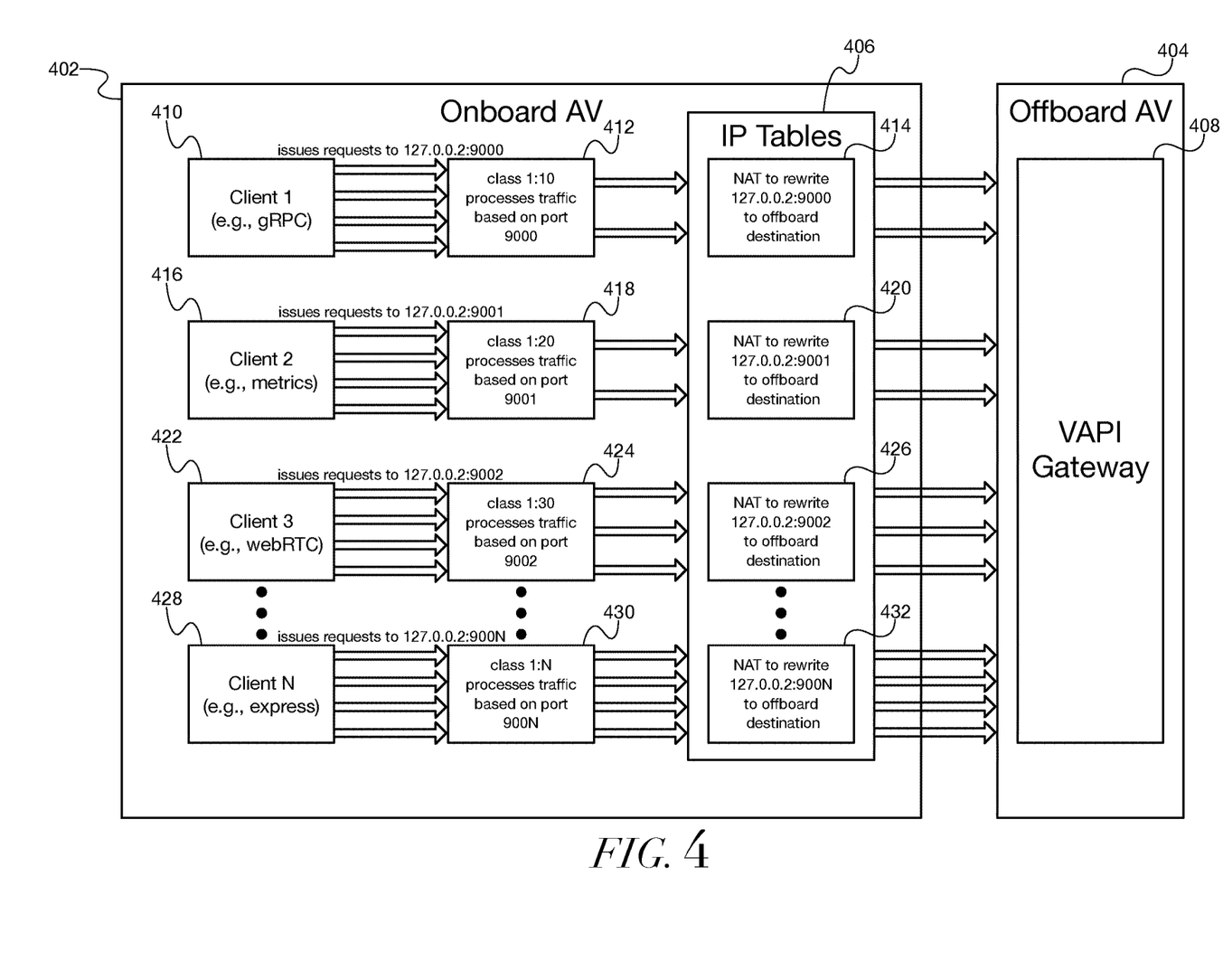
FIG. 4 depicts an example system architecture according to example embodiments of the present disclosure.

Referring to FIG. 4, as previously indicated, one or more computing systems 402 onboard autonomous vehicle 10 (e.g., computing system 102, and/or the like) can execute multiple different and distinct applications. Each of such applications can be associated with a different and distinct client, for example, clients 410, 416, 422, and 428, and, for each application of the applications, computing system 102 can determine, from amongst multiple different and distinct interface identifiers (e.g., addresses, ports, links, and/or the like), an identifier associated with the application. In some embodiments, the multiple different and distinct interface identifiers can be associated with a common (e.g., the same, and/or the like) virtual loopback interface (e.g., an interface associated with the address 127.0.0.2, and/or the like).

In some embodiments, computing system(s) 402 can manage the utilization by the application of the network resources by identifying, based at least in part on the interface identifier, a traffic-control policy for the data associated with the application and managing the utilization by the application of the network resources in accordance with the traffic-control policy for the data associated with the application. For example, computing system(s) 402 can manage, based at least in part on the interface identifier (e.g., 127.0.0.2.9000, and/or the like) data associated with the application associated with client 410 in accordance with traffic-control policy 412. Similarly, computing system(s) 402 can manage, based at least in part on the interface identifier (e.g., 127.0.0.2.9001, and/or the like) data associated with the application associated with client 416 in accordance with traffic-control policy 418; computing system(s) 402 can manage, based at least in part on the interface identifier (e.g., 127.0.0.2.9002, and/or the like) data associated with the application associated with client 422 in accordance with traffic-control policy 424; computing system(s) 402 can manage, based at least in part on the interface identifier (e.g., 127.0.0.2.900N, and/or the like) data associated with the application associated with client 428 in accordance with traffic-control policy 430; and/or the like.

In some embodiments, identifying the traffic-control policy can include identifying, within a network-address-based table, one or more quality of service (QoS) parameters (e.g., resource allocations, utilization limits, and/or the like) for the data associated with the application. In some of such embodiments, managing the utilization by the application of the network resources can include managing the utilization by the application of the network resources in accordance with the one or more QoS parameters.

In some embodiments, managing the utilization by the application of the network resources can include managing the utilization by the application of the network resources in accordance with a root queue discipline (qdisc) associated with the common virtual loopback interface (e.g., the interface associated with the address 127.0.0.2, and/or the like). For example, the utilization by the application of the network resources may be managed using a hierarchical token-bucket paradigm to shape the data associated with the application.

In some embodiments, managing the utilization by the application of the network resources can include identifying, based at least in part on the interface identifier associated with the application, a child discipline of the root qdisc associated with the application. In some of such embodiments, utilization by the application of the network resources can be managed in accordance with the child discipline of the root qdisc associated with the application.

In some embodiments, for one or more applications, managing the utilization by such application(s) of the network resources can include borrowing, based at least in part on the child discipline(s) of the root qdisc associated with such application(s), a portion of the network resources allocated to one or more other of the applications, which can, for example, allow for dynamic resource allocation, leading to faster processing times, response times, and/or the like.

In some embodiments, for each application of the applications, computing system(s) 402 can perform, based at least in part on the interface identifier associated with the application, network address translation (NAT) for the data associated with the application to route the data associated with the application towards vehicle application programming interface (API) gateway 408 provided by one or more computing systems 404 physically located offboard autonomous vehicle 10 (e.g., computing system 80, and/or the like). For example, computing system(s) 402 can include network-address tables 406, which can include portion 414, configured to rewrite data associated with the application associated with client 410 to gateway 408. Similarly, network-address tables 406 can include: portion 420, configured rewrite data associated with the application associated with client 416 to gateway 408; portion 426, configured rewrite data associated with the application associated with client 422 to gateway 408; portion 432, configured rewrite data associated with the application associated with client 428 to gateway 408; and/or the like.

Returning to FIG. 3A, at (310), computing system 102 can receive data (e.g., configuration information, and/or the like) including instructions for managing, at least in part, data associated with one or more of the applications from computing device 40 (e.g., a remotely located computing device associated with a technician, diagnostic system, remote-assistance system, and/or the like). For example, such communication can be via an API provided by computing device 40, computing system 102, and/or the like (e.g., such an API can serve to effectuate a central configuration service used to provide dynamic configuration changes to autonomous vehicle 10, and/or the like).

At (312), computing system 102 can determine, detect, identify, and/or the like one or more changes in a mode, state, context, and/or the like of autonomous vehicle 10. For example, over time the mode, state, context, and/or the like of autonomous vehicle 10 can change (e.g., specified travel can be completed, new travel can commence, one or more diagnostic routines can be initiated, and/or the like), and computing system 102 can determine, detect, identify, and/or the like such changes. For example, computing system 102 can determine, detect, identify, and/or the like whether autonomous vehicle 10 is in a test mode, whether autonomous vehicle 10 is in a diagnostic mode, whether autonomous vehicle 10 is in a remote-assistance mode, whether autonomous vehicle 10 is in an environment-mapping mode, whether autonomous vehicle 10 is engaged in commissioned travel, a type of commissioned travel with which autonomous vehicle 10 is engaged, and/or the like. In some embodiments, computing system 102 can determine, detect, identify, and/or the like one or more of such change(s) based at least in part on the data received from computing device 40.

At (314), responsive to detecting the change(s), computing system 102 can, for one or more of the applications, manage the utilization by such application(s) of the network resources based at least in part on such change(s). For example, based on a determination that autonomous vehicle 10 is in a diagnostics mode, more of the network resources can be allocated to communicating log data, and/or the like. In some embodiments, computing system 102 can manage the utilization by such application(s) of the network resources based at least in part on the data received from computing device 40.

At (316), for each application of such application(s) and in accordance with such resource management, computing system 102 can communicate data associated with the application to computing system 80, which can receive the data.

Referring to FIG. 3B, autonomous vehicle 20 can execute multiple different and distinct applications (e.g., components of one or more software packages configured to operate, control, and/or the like autonomous vehicle 20, and/or the like). For example, such applications can provide, enable, support, and/or the like navigation of autonomous vehicle 20, diagnostics of autonomous vehicle 20, remote-assistance for autonomous vehicle 20, one or more associated data or video streams, and/or the like.

At (318), computing system 80 can communicate data comprising a software development kit (SDK) to autonomous vehicle 20, which can receive the data. Such an SDK can include, for example, one or more routines, libraries, logic, and/or the like that can be utilized (e.g., by an entity associated with autonomous vehicle 20, and/or the like) to communicate data associated with the applications executed by autonomous vehicle 20, and/or the like. For example, autonomous vehicle 20 can be associated with an entity that operates a plurality of associated autonomous vehicles (e.g., a fleet of autonomous vehicles, and/or the like) different and distinct from the plurality of autonomous vehicles that includes autonomous vehicle 10 and is associated with the different and distinct entity with which computing system 80 is associated, and the SDK can be utilized by autonomous vehicle 20 to communicate data associated with the applications executed by autonomous vehicle 20 to computing system 80.

At (320), autonomous vehicle 20 can (e.g., via the SDK, and/or the like) communicate (e.g., directly via one or more wireless-communication interface(s), network(s) 106, and/or the like) data associated with such applications to computing system 80 (e.g., a server, vehicle-management platform, and/or the like), which can receive the data.

At (322), for each application of the applications, autonomous vehicle 20 can (e.g., via the SDK, and/or the like) determine, from amongst multiple different and distinct interface identifiers (e.g., addresses, ports, links, and/or the like), an identifier associated with the application and can communicate (e.g., via the communication at (320), and/or the like), based at least in part on such identifier, data associated with the application and destined for computing system 80 towards computing system 80.

At (324), for each application of the applications, autonomous vehicle 20 can (e.g., via the SDK, and/or the like) manage, based at least in part on the interface identifier associated with the application, utilization by the application of network resources (e.g., bandwidth, and/or the like) interfacing autonomous vehicle 20 and computing system 80 to communicate the data associated with the application and destined for computing system 80. In some embodiments, autonomous vehicle 20 can manage the utilization of the network resources at a media layer of the OSI model (e.g., the level-three network layer, and/or the like), for example, as previously described with respect to FIG. 4.

At (326), for each application of the applications and in accordance with such resource management, autonomous vehicle 20 can communicate data associated with the application to computing system 80, which can receive the data.

At (328), autonomous vehicle 20 can (e.g., via the SDK, and/or the like) receive data (e.g., configuration information, and/or the like) including instructions for managing, at least in part, data associated with one or more of the applications from computing device 40 (e.g., a remotely located computing device associated with a technician, diagnostic system, remote-assistance system, and/or the like). For example, such communication can be via an API provided by autonomous vehicle 20 (e.g., via the SDK, and/or the like), computing device 40, and/or the like (e.g., such an API can serve to effectuate a central configuration service used to provide dynamic configuration changes to autonomous vehicle 20, and/or the like).

At (330), autonomous vehicle 20 can (e.g., via the SDK, and/or the like) determine, detect, identify, and/or the like one or more changes in a mode, state, context, and/or the like of autonomous vehicle 20. For example, over time the mode, state, context, and/or the like of autonomous vehicle 20 can change (e.g., specified travel can be completed, new travel can commence, one or more diagnostic routines can be initiated, and/or the like), and autonomous vehicle 20 can determine, detect, identify, and/or the like such changes. For example, autonomous vehicle 20 can determine, detect, identify, and/or the like whether autonomous vehicle 20 is in a test mode, whether autonomous vehicle 20 is in a diagnostic mode, whether autonomous vehicle 20 is in a remote-assistance mode, whether autonomous vehicle 20 is in an environment-mapping mode, whether autonomous vehicle 20 is engaged in commissioned travel, a type of commissioned travel with which autonomous vehicle 20 is engaged, and/or the like. In some embodiments, autonomous vehicle 20 can determine, detect, identify, and/or the like one or more of such change(s) based at least in part on the data received from computing device 40.

At (332), responsive to detecting the change(s), autonomous vehicle 20 can, for one or more of the applications, manage (e.g., via the SDK, and/or the like) the utilization by such application(s) of the network resources based at least in part on such change(s). For example, based on a determination that autonomous vehicle 20 is in a diagnostics mode, more of the network resources can be allocated to communicating log data, and/or the like. In some embodiments, autonomous vehicle 20 can manage the utilization by such application(s) of the network resources based at least in part on the data received from computing device 40.

At (334), for each application of such application(s) and in accordance with such resource management, autonomous vehicle 20 can (e.g., via the SDK, and/or the like) communicate data associated with the application to computing system 80, which can receive the data.

Referring to FIG. 3C, autonomous vehicle 30 can execute multiple different and distinct applications (e.g., components of one or more software packages configured to operate, control, and/or the like autonomous vehicle 30, and/or the like). For example, such applications can provide, enable, support, and/or the like navigation of autonomous vehicle 30, diagnostics of autonomous vehicle 30, remote-assistance for autonomous vehicle 30, one or more associated data or video streams, and/or the like.

At (336), autonomous vehicle 30 can communicate data associated with such applications to computing system 70 (e.g., a server, vehicle-management platform, and/or the like), which can receive the data and, at (338), can communicate such data to computing system 80, which can receive the data. For example, autonomous vehicle 30 can be associated with an entity that is associated with computing system 70 and operates a plurality of associated autonomous vehicles (e.g., a fleet of autonomous vehicles, and/or the like) different and distinct from the plurality of autonomous vehicles that includes autonomous vehicle 10 and is associated with the different and distinct entity with which computing system 80 is associated, and autonomous vehicle 30 can be configured to communicate (e.g., directly via one or more wireless-communication interfaces, network(s) 106, and/or the like) the data associated with the applications to computing system 70, which can receive such data and communicate (e.g., relay, and/or the like) the data to computing system 80. In some embodiments, such communication can be via an API provided by autonomous vehicle 30, computing system(s) 70 and/or 80, and/or the like. In some embodiments, computing system 70 can be remotely located from autonomous vehicle 30 (e.g., a server, one or more computing devices physically located onboard a different vehicle, and/or the like).

At (340), for each application of the applications, autonomous vehicle 30 can determine, from amongst multiple different and distinct interface identifiers (e.g., addresses, ports, links, and/or the like), an identifier associated with the application and can communicate (e.g., via the communication at (336), and/or the like), based at least in part on such identifier, data associated with the application and destined for computing system 70 towards computing system 70.

At (342), for each application of the applications, autonomous vehicle 30 can manage, based at least in part on the interface identifier associated with the application, utilization by the application of network resources (e.g., bandwidth, and/or the like) interfacing autonomous vehicle 30 and computing system 70 to communicate the data associated with the application and destined for computing system 70. In some embodiments, autonomous vehicle 30 can manage the utilization of the network resources at a media layer of the OSI model (e.g., the level-three network layer, and/or the like), for example, as previously described with respect to FIG. 4.

At (344), for each application of the applications and in accordance with such resource management, autonomous vehicle 30 can communicate data associated with the application to computing system 70, which can receive the data and, at (346), can communicate such data to computing system 80, which can receive the data.

At (348), computing system 70 can receive data (e.g., configuration information, and/or the like) including instructions for managing, at least in part, data associated with one or more of the applications from computing device 40 (e.g., a remotely located computing device associated with a technician, diagnostic system, remote-assistance system, and/or the like), and, at (350), computing system 70 can communicate (e.g., relay, and/or the like) such data to autonomous vehicle 30, which can receive the data. For example, such communication can be via an API provided by autonomous vehicle 30, computing device 40, computing system(s) 70 and/or 80, and/or the like (e.g., such an API can serve to effectuate a central configuration service used to provide dynamic configuration changes to autonomous vehicle 30, and/or the like).

At (352), autonomous vehicle 30 can determine, detect, identify, and/or the like one or more changes in a mode, state, context, and/or the like of autonomous vehicle 30. For example, over time the mode, state, context, and/or the like of autonomous vehicle 30 can change (e.g., specified travel can be completed, new travel can commence, one or more diagnostic routines can be initiated, and/or the like), and autonomous vehicle 30 can determine, detect, identify, and/or the like such changes. For example, autonomous vehicle 30 can determine, detect, identify, and/or the like whether autonomous vehicle 30 is in a test mode, whether autonomous vehicle 30 is in a diagnostic mode, whether autonomous vehicle 30 is in a remote-assistance mode, whether autonomous vehicle 30 is in an environment-mapping mode, whether autonomous vehicle 30 is engaged in commissioned travel, a type of commissioned travel with which autonomous vehicle 30 is engaged, and/or the like. In some embodiments, autonomous vehicle 30 can determine, detect, identify, and/or the like one or more of such change(s) based at least in part on the data received from computing system 70.

At (354), responsive to detecting the change(s), autonomous vehicle 30 can, for one or more of the applications, manage the utilization by such application(s) of the network resources based at least in part on such change(s). For example, based on a determination that autonomous vehicle 30 is in a diagnostics mode, more of the network resources can be allocated to communicating log data, and/or the like. In some embodiments, autonomous vehicle 30 can manage the utilization by such application(s) of the network resources based at least in part on the data received from computing system 70.

At (356), for each application of such application(s) and in accordance with such resource management, autonomous vehicle 30 can communicate data associated with the application to computing system 70, which can receive the data and, at (358), can communicate such data to computing system 80, which can receive the data.

Figure 5:
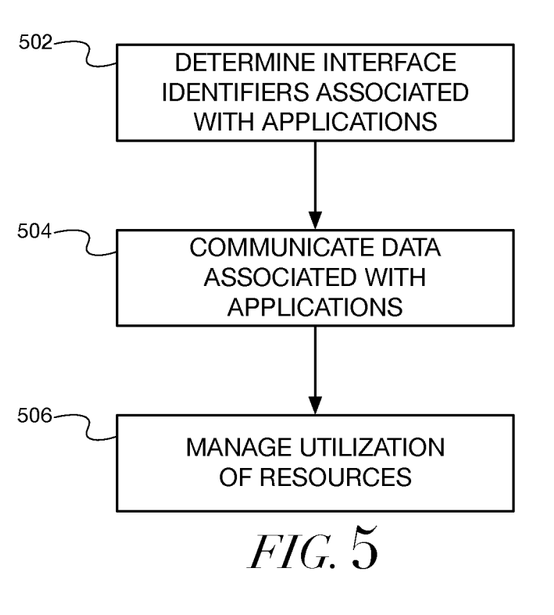
FIG. 5 depicts an example method according to example embodiments of the present disclosure.

FIG. 5 depicts an example method according to example embodiments of the present disclosure.

Referring to FIG. 5, at (502), a computing system comprising one or more computing devices physically located onboard a vehicle can, for each application of a plurality of different and distinct applications executed by the computing system, determine, from amongst a plurality of different and distinct interface identifiers, an interface identifier associated with the application. For example, computing system 102 can determine, for each application of the applications respectively associated with clients 410, 416, 422, and 428, an interface identifier associated with the application.

At (504), the computing system can, for each application of the plurality of different and distinct applications, communicate, based at least in part on the interface identifier associated with the application, data associated with the application and destined for a remotely located computing system. For example, computing system 102 can communicate, for each application of the applications respectively associated with clients 410, 416, 422, and 428 and based at least in part on their respective associated interface identifiers, data associated with the application and destined for computing system 80.

At (506), the computing system can, for each application of the plurality of different and distinct applications, manage, based at least in part on the interface identifier associated with the application, utilization by the application of network resources interfacing the computing system and the remotely located computing system to communicate the data associated with the application and destined for the remotely located computing system. For example, computing system 102 can manage, for each application of the applications respectively associated with clients 410, 416, 422, and 428 and based at least in part on their respective associated interface identifiers, utilization by the application of network resources interfacing computing system 102 and computing system 80 to communicate the data associated with the application and destined for computing system 80.

Figure 6:
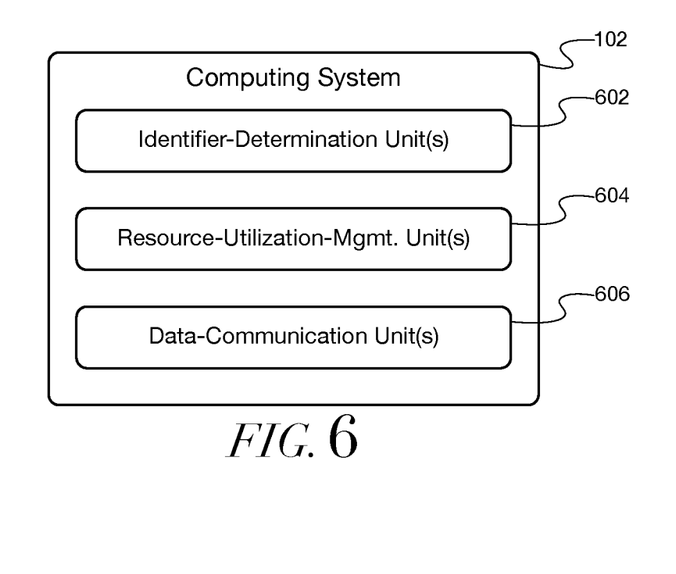
FIG. 6 depicts an example computing system according to example embodiments of the present disclosure.

FIG. 6 depicts an example computing system according to example embodiments of the present disclosure.

Referring to FIG. 6, various means can be configured to perform the methods and processes described herein. For example, computing system 102 can include identifier-determination unit(s) 602, resource-utilization-management unit(s) 604, data-communication unit(s) 606, and/or other means for performing the operations and functions described herein. In some implementations, one or more of the units can be implemented separately. In some implementations, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to determine the interface identifiers associated with the applications, communicate the data associated with the applications, manage the utilization by the applications of the network resources, and/or the like.

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising, for each application of a plurality of different and distinct applications executed by a computing system comprising one or more computing devices physically located onboard a vehicle:
    determining, by the computing system and from amongst a plurality of different and distinct interface identifiers, an interface identifier associated with the application;
    communicating, by the computing system and based at least in part on the interface identifier associated with the application, data associated with the application and destined for a remotely located computing system; and
    managing, by the computing system and based at least in part on the interface identifier associated with the application, utilization by the application of network resources interfacing the computing system and the remotely located computing system to communicate the data associated with the application and destined for the remotely located computing system.

2. The computer-implemented method of claim 1, wherein:
    the method comprises receiving, by the computing system and from a remotely located computing device, data comprising instructions for managing, at least in part, data associated with one or more applications of the plurality of different and distinct applications; and
    for each application of the one or more applications, managing the utilization by the application of the network resources comprises managing the utilization based at least in part on the data comprising the instructions.

3. The computer-implemented method of claim 1, wherein:
    the method comprises determining, by the computing system, one or more changes in at least one of a mode, state, or context of the vehicle; and
    for at least one application of the plurality of different and distinct applications, managing the utilization by the application of the network resources comprises managing the utilization based at least in part on the one or more changes.

4. The computer-implemented method of claim 3, wherein determining the one or more changes comprises determining one or more of:
    whether the vehicle is in a test mode;
    whether the vehicle is in a diagnostic mode;
    whether the vehicle is in a remote-assistance mode;
    whether the vehicle is in an environment-mapping mode;
    whether the vehicle is engaged in commissioned travel; or
    a type of commissioned travel with which the vehicle is engaged.

5. The computer-implemented method of claim 1, wherein managing the utilization by the application of the network resources comprises managing the utilization at a network layer.

6. The computer-implemented method of claim 1, wherein the method comprises, for each application of the plurality of different and distinct applications, performing, by the computing system and based at least in part on the interface identifier associated with the application, network address translation (NAT) for the data associated with the application to route the data associated with the application towards the remotely located computing system.

7. The computer-implemented method of claim 1, wherein managing the utilization by the application of the network resources comprises:
    identifying, based at least in part on the interface identifier, a traffic-control policy for the data associated with the application; and
    managing the utilization by the application of the network resources in accordance with the traffic-control policy for the data associated with the application.

8. The computer-implemented method of claim 7, wherein:
    identifying the traffic-control policy comprises identifying, within a network-address-based table, one or more quality of service (QoS) parameters for the data associated with the application; and
    managing the utilization by the application of the network resources in accordance with the traffic-control policy comprises managing the utilization by the application of the network resources in accordance with the one or more QoS parameters.

9. The computer-implemented method of claim 1, wherein the plurality of different and distinct interface identifiers are associated with a common virtual loopback interface.

10. The computer-implemented method of claim 9, wherein managing the utilization by the application of the network resources comprises managing the utilization by the application of the network resources in accordance with a root queue discipline (qdisc) associated with the common virtual loopback interface.

11. The computer-implemented method of claim 10, wherein managing the utilization by the application of the network resources in accordance with the root qdisc comprises utilizing a hierarchical token-bucket paradigm to shape the data associated with the application.

12. The computer-implemented method of claim 10, wherein managing the utilization by the application of the network resources comprises:
- identifying, based at least in part on the interface identifier associated with the application, a child discipline of the root qdisc associated with the application; and
- managing the utilization by the application of the network resources in accordance with the child discipline of the root qdisc associated with the application.

13. The computer-implemented method of claim 12, wherein, for at least one application of the plurality of different and distinct applications, managing the utilization by the application of the network resources comprises borrowing, based at least in part on the child discipline of the root qdisc associated with the application, a portion of the network resources allocated to another of the plurality of different and distinct applications.

14. The computer-implemented method of claim 1, wherein:
- the vehicle and the remotely located computing system are associated with a common entity that operates a plurality of vehicles including the vehicle; and
- communicating the data associated with the application comprises communicating; via one or more networks; the data associated with the application directly from the vehicle to the remotely located computing system.

15. The computer-implemented method of claim 1, wherein:
- the vehicle is associated with an entity that operates a plurality of vehicles including the vehicle; and
- the remotely located computing system is associated with a different and distinct entity that provides vehicle services.

16. The computer-implemented method of claim 15, wherein communicating the data associated with the application comprises communicating, via one or more networks, the data associated with the application directly from the vehicle to the remotely located computing system.

17. The computer-implemented method of claim 15, wherein communicating the data associated with the application comprises:
- communicating, via one or more networks, the data associated with the application directly from the vehicle to a different and distinct remotely located computing system, the different and distinct remotely located computing system being associated with the entity that operates the plurality of vehicles including the vehicle; and
- receiving, by the remotely located computing system and from the different and distinct remotely located computing system, the data associated with the application.

18. The computer-implemented method of claim 15, wherein communicating the data associated with the application comprises communicating the data associated with the application via a software development kit (SDK) provided to the computing system by the remotely located computing system.

19. A vehicle comprising:
- one or more wireless-communication interfaces; and
- one or more computing devices comprising one or more processors and a memory storing instructions that when executed by the one or more processors cause the one or more computing devices to perform operations comprising, for each application of a plurality of different and distinct applications executed by the one or more computing devices:
  - determining, from amongst a plurality of different and distinct interface identifiers associated with a common virtual loopback interface, an interface identifier associated with the application; and
  - managing, based at least in part on the interface identifier associated with the application, utilization by the application of network resources interfacing the one or more computing devices with a remotely located computing system to communicate data associated with the application towards the remotely located computing system via the one or more wireless-communication interfaces.

20. One or more non-transitory computer-readable media comprising instructions that when executed by one or more computing devices physically located onboard a vehicle cause the one or more computing devices to perform operations comprising, for each application of a plurality of different and distinct applications executed by the one or more computing devices, determining from amongst the plurality of different and distinct interface identifiers, an interface identifier associated with the application, and managing, at a network layer and based at least in part on the interface identifier associated with the application, utilization by the application of wireless-network resources interfacing the one or more computing devices with a remotely located computing system to communicate data associated with the application towards the remotely located computing system.

* * * * *